United States Patent Office 2,840,545
Patented June 24, 1958

2,840,545
N-VINYL-N'-AMINOALKYL-N,N'-ALKYLENE-UREAS AND POLYMERS THEREOF

Robert S. Yost, Oreland, Pa., assignor to Rohm & Haas Company, Philadelphia, Pa., a corporation of Delaware No Drawing. Application September 9, 1955
Serial No. 533,511

14 Claims. (Cl. 260—77.5)

The present invention is concerned with the preparation of new vinyl compounds and their polymers, the vinyl compounds having the Formula I:

I
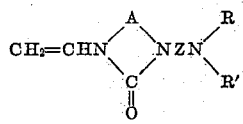

where A is an alkylene group having 2 to 3 carbon atoms of which at least two extend in a chain between the adjoined N atoms, Z is an alkylene group having 2 to 18 carbon atoms of which at least two extend in a chain between the N atoms, R, when not directly attached to R', is selected from the group consisting of H, phenyl, benzyl, cyclohexyl, and alkyl and alkenyl groups having from 1 to 18 carbon atoms, R', when not directly attached to R, is selected from the group consisting of H, phenyl, benzyl, cyclohexyl, and alkyl and alkenyl groups having from 1 to 18 carbon atoms, and R and R', when attached directly together, form a heterocyclic ring with the adjoining N atom of the formula and are selected from the group consisting of the morpholino residue

=(CH$_2$CH$_2$)$_2$O the piperidino residue —(CH$_2$)$_5$— and the pyrrolidino residue —(CH$_2$)$_4$—.

Preferred compounds are those in which the symbols A and Z are both ethylene and R and R' are selected from the group consisting of hydrogen and alkyl groups having 1 to 4 carbon atoms.

The new compounds of Formula I are made by reacting acetylene with a compound of Formula II:

II
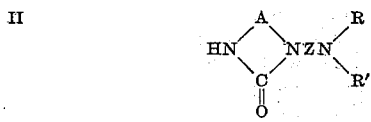

wherein the symbols are as defined hereinabove. The reaction may be effected at temperatures of 90° to 160° C. and preferably between 110° and 130° C. in the presence of sodium or potassium metal as a catalyst. There may be used from 5 to 20 mole percent thereof, based on the weight of the compound of Formula II used in the reaction. The reaction is effected under pressures ranging from 300 to 500 pounds per square inch gage and preferably between 400 and 450 pounds per square inch gage. While the ratio between the acetylene and the compound of Formula II that is used in the reaction may vary somewhat, it is preferred to provide just sufficient acetylene or a slight molar excess thereof to completely vinylate the hydrogen on the ring nitrogen of the compound of Formula II. The introduction of a considerable excess of acetylene such as 3 to 4 moles of acetylene per mole of the compound of Formula II produces polymeric products. When the compound of Formula II is liquid at the temperature and pressure of reaction, there is no need for a solvent. However, whether this reactant is liquid or a solid, a solvent may be used, such as dimethoxyethane, t-butyl alcohol, t-amyl alcohol or other inert organic solvent.

The product of Formula I may be recovered by stripping off solvent and fractional distillation of the remainder.

Examples of the new compounds that may be prepared include the following: 1-(β-aminoethyl)-3-vinyl-imidazolidinone-2; 1-(β-methylaminoethyl) - 3 - vinyl-imidazolidinone-2; 1 - (β-dimethylaminoethyl) - 3 - vinyl-imidazolidinone-2; 1 - (β-ethylaminoethyl)-3-vinyl-imidazolidinone-2; 1-(β-diethylaminoethyl) - 3 - vinyl-imidazolidinone-2; 1-(β-isopropylaminoethyl)-3-vinyl-imidazolidinone-2; 1-(β-octadecylaminoethyl)-3-vinyl-imidazolidinone-2; 1-(β-morpholinoethyl) - 3 - vinyl-imidazolidinone-2; 1-(β-piperidinoethyl) - 3 - vinyl-imidazolidinone - 2; 1-(β-pyrrolidinoethyl)-3-vinyl-imidazolidinone - 2; 1 - (γ - dimethylaminopropyl)-3-vinyl-imidazolidinone - 2; 1 - (β -dimethylaminoethyl)-5-methyl-vinyl-imidazolidinone-2; 1 - (4 - dimethylaminobutyl)-5-methyl-3-vinyl-imidazolidinone-2; 1-(β - ethylaminodecyl)-5-methyl-3-vinyl-imidazolidinone - 2; 1-(10-dimethylaminodecyl) - 3 - vinyl-imidazolidinone - 2; 1-(β - aminoethyl) - 3 - vinyl-tetrahydro-pyrimidinone-2; 1-(β-dimethylaminoethyl) - 3 - vinyl-tetrahydro-pyrimidinone-2; 1-(β-diethylaminoethyl) - 3 - vinyl-tetrahydro-pyrimidinone-2; 1-(β - dicyclohexylaminoethyl) - 3 - vinyl-tetrahydro-pyrimidinone-2; 1-(β-(isopropylamino)propyl) - 3 - vinyl-tetrahydro-pyrimidinone-2; 1-(5-butylaminopentyl)-3-vinyl-tetrahydro-pyrimidinone - 2; 1 - (5 - hexadecylaminopentyl)-3-vinyl-tetrahydro-pyrimidinone - 2; 1-(β-morpholinoethyl)-3-vinyl-tetrahydro-pyrimidinone - 2; 1 - (β-(methylbenzylamino)propyl)-3-vinyl-tetrahydro-pyrimidinone-2.

The compounds of Formula II in which at least one of R and R' is other than hydrogen and their preparation are disclosed and claimed in my copending application Serial No. 533,510, filed on even date herewith. They may be made by reacting a primary or secondary amine with certain new compounds which I have recently discovered having the Formula III:

III

where X is a halogen selected from the group consisting of chlorine and bromine.

Examples of amines of primary and secondary type, which may be reacted with a compound of Formula III to produce the compounds of Formula II include: methylamine, dimethylamine, ethylamine, diethylamine, propylamine, isopropylamine, n-butylamine, di-(n-butyl)-amine, sec-butylamine, di-(sec-butyl)amine, amylamine, hexylamine, cyclohexylamine, dicyclohexylamine, phenylamine, diphenylamine, benzylamine, dibenzylamine, methylbenzylamine, methylphenylamine, methylethylamine, ethylbenzylamine, n-octylamine, di-(n-octyl)amine, laurylamine, 2-dodecenylamine, hexadecylamine, octadecylamine, di-(octadecyl)amine, morpholine, piperidine, pyrrolidine.

The reaction of the primary or secondary amine with a compound of Formula III to produce the compounds of Formula II may be effected in a solvent, such as benzene, toluene, xylenes, water, or alcohols, such as ethanol, isopropanol, butanol, and so on. Generally, from 2 to 3 moles of the amine is used to each mole of the compound of Formula II so that excess amine is available to take up the hydrogen chloride or hydrogen bromide liberated. Instead of having an excess of the amine reactant to accept the hydrohalide developed, there may be used at least one mole of a tertiary amine, such as trimethylamine, triethylamine, or the like, for each mole of the compound of Formula III reacted for the purpose of accepting the hydrohalide developed. The temperature of reaction may be from room temperature for a period of 24 to 48 hours or more up to about 200° C. for periods of 15 minutes or so. When a volatile amine is used, such as monomethylamine, an autoclave may be employed to facilitate the retention of the amine within the reaction medium at elevated temperatures. When a volatile amine is used, as mentioned before, a pressure of 50 to 100 pounds per square inch gage may be developed, such as at a reaction temperature of 100° C. The product may be isolated by filtering off the hydrochloride salt or hydrobromide salt of the amine reactant when such salt is insoluble and leaving the product amine in solution. Then solvent is distilled thoroughly and the product is distilled at low pressures on the order of 1 to 2 mm. Hg. If no insoluble amine salt is produced in the reaction, isolation may be effected by the addition of an alkaline material, such as sodium methoxide, to precipitate sodium chloride or sodium bromide and liberate the free amines. The salt is then filtered off and the amines are fractionally distilled to produce the product.

The compounds of Formula III may be made in the manner described and claimed in my copending application, Serial No. 500,300, filed on April 8, 1955, and involves the reaction of thionyl halides of the Formula IV with a compound of Formula V:

IV     SOX

V

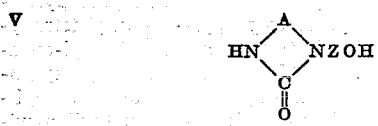

where X, A, and Z are as defined above. The thionyl halide and the compound of Formula V may be used in approximately equimolar amounts and the reaction is preferably effected in a solution of the compound of Formula V, such as in chloroform. Preferably the thionyl halide is added gradually. For example, when the reaction involves a batch containing about two moles of a compound of Formula V, the thionyl halide may be added over a period of two hours. Reaction is preferably effected at a temperature of 30° to 100° C. Advantageously, it may be carried out with the solvent at reflux, in the case of chloroform, refluxing occurring at a temperature of about 58° to 66° C. After completion of the addition of the thionyl halide, the solvent, such as the chloroform, may be gradually distilled while introducing toluene until the temperature in the vessel reaches about 105° to 109° C. It is then refluxed for about 20 hours in the toluene. The product of Formula III is usually soluble in the hot toluene which is cooled to about 5° to 10° C. or lower to precipitate the compound of Formula III. The precipitated product may then be filtered and, if desired, washed with cold toluene. It is then air-dried or dried under a vacuum at room temperature. Instead of chloroform, other solvents, such as carbon tetrachloride and ethylene dichloride, may be used; and in place of toluene, other non-polar solvents, such as benzene, xylene, or the like may be used.

The compounds of Formula V may be made in various ways described in U. S. Patent 2,727,019. For example, as there disclosed, urea may be condensed with a hydroxyalkylaminoalkylamine, such as any one of the following:

V(a)     $HOCH_2CH_2NHCH_2CH_2NH_2$
V(b)     $HOCH_2CH_2NHCH_2CH_2CH_2NH_2$
V(c)     $HOCH_2CH_2NHCH(CH_3)CH_2NH_2$
V(d)     $HOCH(CH_3)CH_2NHCH_2CH_2NH_2$
V(e)     $HOCH(CH_3)CH_2NHCH_2CH_2NH_2$
V(f)     $HOCH_2CH_2CH_2NHCH_2CH_2NH_2$
V(g)     $HOCH_2CH_2CH_2NHCH(CH_3)CH_2NH_2$
V(h)     $HO(CH_2)_4NHCH_2CH_2NH_2$
V(i)     $HO(CH_2)_5NHCH_2CH_2CH_2NH_2$
V(j)     $HO(CH_2)_{10}NHCH_2CH_2NH_2$
V(k)     $HOCH(C_6H_5)CH_2NHCH_2CH_2NH_2$
V(l)     $HOCH(C_6H_5)CH_2NHCH(CH_3)CH_2NH_2$
V(m)     $HOCH(CH=CH_2)CH_2NHCH_2CH_2NH_2$
V(n)     $HOCH(CH=CH_2)CH_2NHCH(CH_3)CH_2NH_2$
V(o)     $HOCH(C_6H_{13})CH_2NHCH_2CH_2NH_2$
V(p)     $HOCH(C_8H_{17})CH_2NHCH(CH_3)CH_2NH_2$
V(q)     $HOCH(C_{16}H_{33})CH_2NHCH_2CH_2NH_2$
V(r)

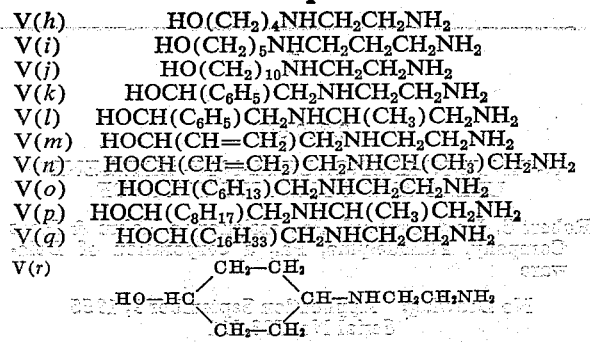

The reaction with urea may be effected by mixing one of the above hydroxy-diamines with an approximately equimolecular weight of urea and heating the mixture at sufficient temperature to evolve ammonia. Generally, temperatures may be between 200° to 210° C. Usually the reaction runs in two temperature ranges, initial evolution of ammonia occurring at 110° to 150° C., and the completion of the evolution of ammonia being effected at temperatures of 150° to 200° C.

The monomeric compounds of Formula I are all liquids at normal room temperature. They are generally soluble in water and alcohols, such as methanol, ethanol, and isopropanol, provided the substituents Z, R, and R' are not over 4 to 6 carbon atoms in size. All of the compounds of Formula I, regardless of the number of carbon atoms in Z, R, and R', are generally soluble in benzene, toluene, xylenes, chloroform, carbon tetrachloride, dimethylformamide, dimethylacetamide, and generally in ethyl acetate, ether, acetone, dioxane, nitroethane, and so on. The compounds are fairly stable under normal conditions of storage, but to assure prolonged stability, it is preferred to store them in nitrogen atmosphere or under some other inert gas and under refrigeration, such as at −10° C. to 10° C.

The compounds of Formula I serve as corrosion inhibitors for automotive antifreezes, refrigerants, and water-base paints. They may be applied to cellulose esters and particularly cellulose acetate fibers or fabrics made therefrom which have been dyed for the purpose of inhibiting gas-fading of the dye. They may be applied to textiles, especially of cellulosic types to impart water-repellency or to function as a lubricant when a long chain hydrophobic group is present in the portion of R, R', and/or Z. The compounds having proper hydrophobic-hydrophilic balance are surface-active and serve as detergents and dispersing agents.

Those compounds of Formula I in which at least one of R and R' is hydrogen are reactive with formaldehyde and they may be used as components of aminoplast resins, such as ureaformaldehyde or triazine-formaldehyde condensates to provide a two-stage type of resin that is adapted to be polymerized both through an addition mechanism of the vinyl group and a condensation mechanism. The modified aminoplasts are useful to modify cellulosic films and fibers, wool, casein, paper, rayon and cotton. On such materials, they may serve to reduce shrinkage or to crease-proof as in the case of fabrics. They may also be applied to the base materials just mentioned for the purpose of providing an anchoring or subcoating to increase the adhesion of the base for other resins to be applied thereto.

The compounds of Formula I are adapted to be polymerized by an addition mechanism in bulk, solution, emulsion, or suspension technique using any suitable free radical catalyst, but preferably an azo type. In the solution procedure, such solvents at water, dioxane, or a lower alcohol, including ethanol and isopropanol, may be used. A water-insoluble compound of Formula I is readily adapted to the emulsion technique of polymerization. Even the water-soluble monomers are useful in a suspension technique if brine is used.

The polymerization is effected with the aid of a free radical initiator or catalyst, such as an organic or inorganic peroxide catalyst, peroxy catalysts, such as persulfates, and the azo catalysts. From 0.1% to 3% or more of the initiator or catalyst may be used, based on the total weight of the monomers. To provide a high molecular weight, it is preferred to use from 0.5% to 1% of the initiator. Examples of organic peroxide catalysts that may be used include benzoyl peroxide, acetyl peroxide, caproyl peroxide, butyl perbenzoate, butyl hydroperoxide. Examples of azo catalysts include azodiisobutyronitrile, azodiisobutyramide, dimethyl or diethyl or dibutyl azodiisobutyrate, azobis($\alpha$,$\gamma$-dimethylvaleronitrile), azobis($\alpha$-methylbutyronitrile), azobis($\alpha$-methylvaleronitrile), dimethyl or diethyl azobismethylvalerate, and the like.

In the case of emulsion polymerization particularly, a redox system is extremely effective. Here an organic peroxide may be used or an inorganic peroxide such as hydrogen peroxide, ammonium persulfate, sodium persulfate, or potassium persulfate in amounts similar to those stated above. The peroxidic catalyst is effectively coupled with a reducing agent such as an alkali metal sulfite, bisulfite, or metabisulfite, or hydrosulfite, or hydrazine. The action of the redox system may be controlled through use of a chain transfer agent or regulator, such as mercaptoethanol or other mercaptan. Such regulator also finds use outside of redox systems with organic or inorganic peroxides and with azo catalysts, such as azodiisobutyronitrile, azodiisobutyramide, or diethyl azodiisobutyrate.

When a solution technique is used, the direct product of the polymerization is a viscous solution of the polymer, or it may be that the polymer is precipitated from the solution depending upon the particular solvent, the particular monomers and their properties. When the polymers automatically precipitate because of their insolubility in the solution, it is merely necessary to filter the product and wash the polymer in order to isolate it. When the product is a viscous solution of the polymer, it may be precipitated by adding a solvent for the polymerization solvent in which the polymer is insoluble after which the suspension or slurry may be filtered or decanted and the polymer washed. Alternatively, the solvent may be distilled to leave the polymer.

In the case of emulsion polymerization, examples of suitable non-ionic emulsifiers include the higher alkyl phenoxypolyethoxyethanols in which the alkyl has from 6 to 18 carbon atoms, such as octyl, dodecyl or octadecyl, and there may be from 8 to 50 or more oxyethylene units. Examples of anionic emulsifiers include the higher fatty alcohol sulfates, such as sodium lauryl sulfate; examples of cationic emulsifiers include higher alkyl pyridinium salts such as lauryl pyridinium chloride, (octylbenzyl)trimethylammonium chloride, and so on.

Examples of vinylidene or monoethylenically unsaturated compounds that may be copolymerized with the compound of Formula I include vinylpyridines, such as 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene and its homologues and analogues, vinylpyridine, vinylcarbazol, and allyl esters of monocarboxylic acids. Specific ethylenically unsaturated compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureidoethyl vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, $\alpha$-methylstyrene, p-methylstyrene, p-chlorostyrene, vinylnaphthalene, etc.

The compounds of Formula I in which at least one of R and R' is hydrogen may be copolymerized with ethylene, isobutylene, vinyl chloride and vinyl ethers such as methyl vinyl ether. However, the compounds of Formula I in which both R and R' are other than hydrogen may be copolymerized with a much wider range of monoethylenically unsaturated comonomers including vinyl pyridines, such as 2-vinylpyridines and 4-vinylpyridines, acrylonitrile, methacrylonitrile, acrylic and methacrylic acids, their esters, amides and salts, itaconic acid and its functional derivatives, particularly its esters, maleic anhydride or maleic and fumaric acids and their esters, vinyl ethers and esters, vinyl sulfides, styrene and its homologues and analogues, vinylpyridine, vinylcarbazol, and allyl esters of monocarboxylic acids. Specific vinylidene compounds are methyl, ethyl, isopropyl, butyl, tert-butyl, octyl, dodecyl, octadecyl, octenyl, or oleyl acrylates or methacrylates or itaconates, dimethyl maleate or fumarate, diethyl maleate, diethyl fumarate, diethyl citraconate, diethyl chloromaleate, dimethylaminoethyl acrylate or methacrylate, tert-butylaminoethyl acrylate or methacrylate, dimethylaminopropyl acrylate or methacrylate, acrylamide, methacrylamide, N-methylacrylamide, N-butylmethacrylamide, dimethylaminoethylacrylamide, dimethylaminopropylacrylamide, or the comparable methacrylamides, hydroxyethyl vinyl ether, octyl vinyl ether, dodecyl vinyl ether, ureido vinyl ether, ureidoisobutyl vinyl ether, ethyl vinyl ether, butyl vinyl ether, butyl vinyl sulfide, methyl vinyl sulfide, dodecyl vinyl sulfide, vinyl acetate, vinyl propionate, vinyl laurate, $\alpha$-methylstyrene, p-methylstyrene, p-chlorostyrene, vinylnaphthalene, etc. When two or more free radical-polymerizable vinylidene groups occur, as in divinylbenzene, trivinylbenzene, ethylene diacrylate or methacrylate, bis(vinyloxyethyl)urea, or vinyloxyethyl acrylate or methacrylate, insoluble interpolymers result.

The polymers have a wide variety of uses. As in the case of the monomers, the polymers may be incorporated with aminoplast thermosetting resin condensates, such as those of urea-formaldehyde and triazine-aldehyde, such as melamine-formaldehyde, to provide anchoring agents applicable to various bases, such as cellulosic films and fibers, to increase adhesion of subsequently applied resins of numerous types. Such modified aminoplast condensates may also be applied to reduce shrinkage of cellulosic fabrics, such as cotton and rayon, and to impart crease-resistance or crush-resistance of such cellulosic fabrics. Polymers and copolymers of the compounds of Formula I in which both R and R' are hydrogen are useful as additives for paper, such as at the beater stage, to increase the wet strength of the final paper after drying and ageing or after heating to elevated temperatures in the vicinity of 400° F. for 5 to 10 seconds. The polymers of the compounds of Formula I, including both homopolymers and copolymers, in which at least one of the substituents R and R' is hydrogen, are useful as coatings and adhesive compositions adapted to be cured to an infusible and insoluble condition by baking at a temperature of 150° to 400° C. for a period of 10 seconds to one hour, the higher the temperature the shorter the time. Such thermosetting compositions are adapted to be used as molding or casting resins or components thereof with other molding resins for the formation of films, sheets, rods, or other shaped articles. Copolymers of the compounds of Formula I in which at least one of the substituents R and R', and preferably both, are long chain hydrocarbon groups, such as octyl-2-octadecyl, are useful as oil additives to improve the properties of the oil, and to inhibit corrosion thereby. Insoluble types of copolymers are useful as anion-exchange resins wherever weakly basic character is required. Such insoluble copolymers may be obtained by cross-linking with divinylbenzene, diethylene glycol dimethacrylate, or other diethylenically unsaturated compounds.

The compounds of Formula I may be reacted with an alkylating agent to produce quaternary ammonium salts having the structure of Formula VI:

VI
$$CH_2=CHN\underset{\underset{O}{\overset{\|}{C}}}{\overset{A}{\diagup}}\underset{Y}{\overset{R\ R'}{\diagdown}}\underset{R^2}{\overset{|}{NZN}}$$

where R and R' are as defined above except that they are not hydrogen, Y is an anion, such as chloride, bromide, hydroxide, sulfate, etc., and $R^2$ and Y are the components of the alkylating agent introduced.

Examples of the alkylating agents include methyl chloride, ethyl chloride, benzyl chloride, allyl chloride, substituted allyl chloride, e. g., dodecylallyl chloride, dodecenyl chlorides, alkylbenzyl chlorides, e. g., octylbenzyl chlorides (from diisobutylene), any chloromethylated aromatic-like compound, e. g., chlorobenzyl chloride, chloromethylated thiophene, chloromethylated furane, chloromethylated naphthalene, or corresponding bromides or iodides, e. g., phenoxyethyl bromide, methyl iodide; dimethyl sulfate, dimethyl sulfite, dimethyl phosphite, ethylene oxide, propylene oxide, styrene oxide, and butylene oxide. The quaternization may be effected in a solvent such as a lower alcohol, e. g. methanol, ethanol, isopropanol. Generally, the reaction may be effected at a temperature between 50° and 120° C., preferably between 70° and 90° C., and conveniently at the temperature of reflux or boiling of the solvent used. The product may be recovered by distilling off the solvent, at atmospheric pressure or in vacuo. The quaternaries can also be made by progressively alkylating a compound of Formula I in which R is hydrogen. After quaternization, the compounds of Formula VI may be polymerized in essentially the same way as the compounds of Formula I. On the other hand, polymers (including copolymers) of the compounds of Formula I may be quaternized by means of the alkylating agents mentioned above under essentially the same conditions as are there specified for the quaternization of the compounds of Formula I. The quaternaries and their polymers are disclosed and claimed in my copending application Serial No. 557,654, filed January 6, 1956.

In the following examples, which are illustrative of the invention, the parts given are by weight unless otherwise noted:

EXAMPLE 1

Potassium metal (3.9 grams, 0.1 mole) is dissolved in crude (88% purity) N-(β-aminoethyl)-N,N'-ethyleneurea (173 grams, 1.34 moles) and heated to 45° to 60° C. under nitrogen. The resulting solution (176 grams) is charged to a magnetically-stirred autoclave and swept with nitrogen and acetylene. The reactor is heated to 116° to 134° C. and acetylene is pressed in at 425 to 480 p. s. i. g. over a period of two hours. The weight of acetylene absorbed is 33 grams (1.27 moles). The reaction products are black and viscous.

A portion (198 grams) of the reaction products is flash-distilled into a Dry Ice-acetone cooled receiver to give a clear, yellow distillate (166 grams) and a dark, tacky residue (26 grams).

The distillate is rectified through a modified Claisen head, and 97 grams of 1-(β-aminoethyl)-3-vinyl-imidazolidinone-2 is obtained having a boiling range of 110° to 114° C./0.4 mm. Hg and having $d_{20}^{20}$ 1.1144, and $n_D^{20}$ 1.5407.

Theoretical for $C_7H_{13}N_3O$: C, 54.17%; H, 8.44%; N, 27.07%; mol. wt. 155. Found: C, 55.32%; H, 8.43%; N, 26.4%; mol. wt. 159.

EXAMPLE 2

Potassium metal (15.7 grams, 0.403 mole) is dissolved under nitrogen in a solution of N-(β-aminoethyl)-N,N'-ethyleneurea (520 grams, 4.03 moles) in anhydrous dimethoxyethane (87 grams, 100 cc.). The resulting solution (622.7 grams) is heated to 70° C. and charged to the stirred autoclave of Example 1.

The reactor and contents are heated with steam to 118° C. and acetylene is introduced under pressure (350 to 490 p. s. i. g.) from a calibrated reservoir. The reaction is extremely exothermic; the temperature rises rapidly to 190° C. upon the initial introduction of acetylene. By adjusting the rate of acetylene introduction, and by appropriate use of water cooling, the temperature is maintained at 130° to 160° C. over a period of 15 minutes. During the period, acetylene (151 grams, 5.8 moles) is absorbed rapidly.

A portion (754 grams) of the dark, fluid reaction products are flash-distilled into a Dry Ice-acetone cooled receiver to give a clear, yellow distillate (486 grams) and a dark brown residue (258 grams) which had a strong odor of ammonia.

The flash-distillate is fractionally distilled through a modified Claisen head, and 346 grams of 1-(β-aminoethyl)-3-vinyl-imidazolidinone-2 is obtained.

EXAMPLE 3

Potassium metal (15.7 grams, 0.403 mole) is dissolved in a solution of N-(β-aminoethyl)-N,N'-ethyleneurea (520 grams, 4.03 moles) in t-butyl alcohol (155 grams, 200 cc.) to give a solution which is homogeneous at room temperature.

The solution (679 grams) is charged to a one-liter stirred autoclave and heated under a slight pressure of acetylene to 108° C. Acetylene (135 grams, 5.20 moles) under pressure (380 to 450 p. s. i. g.) is metered in from a calibrated reservoir over a period of one hour. The temperature is maintained at 110° to 155° C. by applying cooling water to the jacket of the autoclave. The fluid reaction products (814 grams) are deep brown in color.

A portion (802 grams) of the reaction products is flash-distilled into a Dry Ice-acetone cooled receiver to give a clear distillate (733 grams) and a solid, brown residue (45 grams). This flash-distillate is further distilled, and 521 grams of 1-(β-aminoethyl)-3-vinyl-imidazolidinone-2 is obtained.

EXAMPLE 4

Potassium metal (2.7 grams, 0.068 mole) is dissolved at 50° C. in N-(β-methylaminoethyl)-N,N'-ethyleneurea (97 grams, 0.68 mole) under a nitrogen atmosphere. The resulting solution is fluid at room temperature.

The solution (97 grams) is transferred to a magnetically-stirred autoclave and swept with nitrogen and acetylene. The reactor is heated to 120° C. and acetylene (400 to 500 p. s. i. g.) is pressed in from a calibrated receiver. The reaction is extremely exothermic. Within a period of 15 minutes at 120° to 180° C. (23 grams, 0.89 mole) of acetylene is absorbed. The crude reaction products are quite dark in color, and of high viscosity. A small amount of ethanol is employed for rinsing the reactor.

The ethanol is removed by stripping in vacuo, and the high-boiling residual oil is flash-distilled into a Dry Ice-acetone cooled receiver. The flash-distillate is fractionally distilled, and 5 grams of 1-(β-methylaminoethyl)-3-vinyl-imidazolidinone-2 boiling in the range 108° to 109° C./0.5 mm. Hg is obtained as a yellow liquid.

Calculated for $C_8H_{15}N_3O$: C, 56.78%; H, 8.94%; N, 24.83%. Found: C, 56.63%; H, 9.00%; N, 25.31%.

EXAMPLE 5

Potassium metal (4.3 grams, 0.11 mole) is dissolved in N - ($\beta$ - dimethylaminoethyl) - N,N' - ethyleneurea (180 grams, 1.14 moles) and heated under nitrogen to a temperature (55° to 60° C.) slightly above the melting point of the amino-urea (52° to 54 C.).

The resulting hot solution is charged to a magnetically-stirred autoclave, flushed with nitrogen and acetylene and contacted with acetylene (422 to 471 p. s. i. g.) at 115° to 139° C. over a period of 1.25 hours. The weight of acetylene absorbed is 31 grams (1.19 moles).

The fluid black products (185 grams) are diluted with absolute ethanol (150 cc.). The resulting solution is flash-distilled into a Dry Ice-acetone cooled receiver to give a clear distillate (182 grams) and a viscous residue (65 grams). The ethanol is removed from the distillate by distillation in vacuo.

The residual oil (124 grams) is fractionated, and 115 grams of 1-($\beta$-dimethylaminoethyl)-3-vinyl-imidazolidinone-2, boiling in the range 99° to 101° C./0.25 to 0.29 mm. Hg, is obtained. It has the physical constants $n_D^{20}$ 1.5083; $d_{20}^{20}$ 1.0257.

Calculated for $C_9H_{17}N_3O$: C, 58.98%; H, 9.35%; N, 22.93%. Found: C, 58.86%; H, 9.02%; N, 23.07%.

EXAMPLE 6

(a) Potassium metal is dissolved in melted 1-($\beta$-octadecylaminoethyl) - imidazolidinone - 2 and acetylene is reacted therewith as in Example 1 yielding 1-($\beta$-octadecylaminoethyl)-3-vinyl-imidazolidinone-2. Leather is rendered water-repellent upon application of this product by swabbing or rubbing.

(b) In similar fashion, 1-($\beta$-morpholinoethyl)-imidazolidinone-2 is converted to 1-($\beta$-morpholinoethyl)-3-vinyl-imidazolidinone-2.

EXAMPLE 7

(a) Sodium is dissolved in melted 1-($\beta$-dicyclohexylaminoethyl)-tetrahydro-pyrimidinone-2 and acetylene is reacted therewith as in Example 1 yielding 1-($\beta$-dicyclohexylaminoethyl)-3-vinyl-tetrahydro-pyrimidinone-2.

(b) By the procedure of Example 2, 1-($\beta$-aminoethyl)-3-vinyl-tetrahydro-pyrimidinone-2 is obtained by the reaction of acetylene with 1-($\beta$-aminoethyl)-tetrahydro-pyrimidinone-2.

(c) By the procedure of Example 2, 1-($\beta$-aminopropyl)-5-methyl-imidazolidinone-2 is reacted with acetylene with the production of 1-($\beta$-aminopropyl)-5-methyl-3-vinyl-imidazolidinone-2.

EXAMPLE 8

(a) By the process of Example 3, 1-($\beta$-didodecylaminoethyl)-tetrahydro-pyrimidinone-2 is reacted with acetylene with the production of 1-($\beta$-didodecylaminoethyl)-3-vinyl-tetrahydro-pyrimidinone-2.

(b) Similarly reaction of acetylene with 1-($\beta$-(methylbenzylamino)propyl - tetrahydro - pyrimidinone - 2 produces 1 - ($\beta$ - (methylbenzylamino)propyl) - 3-vinyl-tetrahydro-pyrimidinone-2.

EXAMPLE 9

A mixture of 12.4 parts of 1-($\beta$-aminoethyl)-3-vinyl-imidazolidinone-2, 8.4 parts of ethanol and 0.24 part of $\alpha,\alpha'$-azobisisobutyronitrile are heated together, in a nitrogen atmosphere, at 70° C. for twenty hours. During this period an extremely viscous, clear yellowish solution is formed. The solution is diluted to 30% solids with ethanol and the polymer is separated from unreacted monomer by dialysis with water using regenerated cellulose tubing. After dialyzing for three days, 78.8 parts of a clear, orange aqueous polymer solution is obtained having a solids content of 7.8%. The solution is concentrated to 25% solids and then is found to have a viscosity of Y+ (Gardner-Holdt at 25° C.).

The polymer is a very effective agent for the development of wet-strength in paper at pH's of 7 to 10 (see Example 11).

EXAMPLE 10

To a mixture of 10.0 parts of a 14.2% solution of poly[1 - ($\beta$ - aminoethyl) - 3 - vinyl - imidazolidinone - 2] and 1.27 parts of 29.9% hydrochloric acid is added 0.83 part of 36.4% formaldehyde. The resulting solution has a solids content of 14.7%. It is effective as an agent for development of wet-strength in paper over the pH range of 4 to 10 (see Example 11).

EXAMPLE 11

The polymer solutions of Examples 9 and 10 and a conventional urea-formaldehyde (U–F) wet-strength resin are applied to separate portions of an unbleached kraft pulp at the pH values (obtained by adjustment with $H_2SO_4$ or NaOH) noted in the following table. The concentrations noted refer to percentage resin or polymer solids based on the dry pulp weight. The table gives the wet strengths of the dried paper sheets 3 days, 7 days, and 28 days after manufacture.

Table

| Resin | Conc., Percent | pH | Wet Strength (lbs./in.) After— | | |
|---|---|---|---|---|---|
| | | | 3 days | 7 days | 28 days |
| Ex. 9 | 1 | 7 | 6.1 | 6.2 | 7.2 |
| Ex. 9 | 1 | 9 | 7.0 | 6.8 | 7.9 |
| Ex. 10 | 1 | 4.5 | 5.6 | 4.6 | 5.1 |
| Ex. 10 | 1 | 7 | 5.6 | 5.8 | 6.7 |
| Ex. 10 | 1 | 9 | 6.1 | 6.1 | 6.9 |
| U–F | 1 | 4.5 | 5.0 | 5.3 | 6.1 |
| U–F | 2 | 4.5 | 8.0 | 7.9 | 8.4 |

The U–F resin gives its maximum wet strength at a pH of 4.0 to 4.5 so no values are given at higher pH. The compounds have the advantage that they do not require a highly acidic condition to provide good wet strengths.

EXAMPLE 12

A mixture of 18.9 parts ($\beta$-dimethylaminoethyl)-3-vinyl-imidazolidinone-2, 18.7 parts of ethanol and 0.37 part of $\alpha,\alpha'$-azobisisobutyronitrile are heated together, in a nitrogen atmosphere, at 70° C. for six and one-half hours. The resulting clear, viscous solution is diluted with an equal volume of ethanol and the polymer is precipitated by slow addition of its solution to rapidly-stirred hexane. The polymer, a sticky mass, is separated from the hexane solution by decantation of the latter and is redissolved in ethanol to give 110 parts of a 10.3% solids solution.

EXAMPLE 13

A mixture of 68.5 parts of methyl methacrylate, 31.5 parts of 1 - ($\beta$-dimethylaminoethyl)-3-vinyl-imidazolidinone-2, 68 parts of toluene and 1.0 parts of $\alpha,\alpha'$-azobisisobutyronitrile is heated in a nitrogen atmosphere at 70° C. for four hours and forty minutes to yield a clear, colorless, viscous solution. The solution is diluted with two volumes of toluene and the polymer is precipitated by the slow addition of its solution to rapidly-stirred hexane. The coarse, white solid polymer, after drying in vacuo, weighs 83 parts. Analysis of the product shows it to contain 13.7 mole percent of 1-($\beta$-dimethylaminoethyl)-3-vinyl-imidazolidinone units and 86.3 mole percent of methyl methacrylate units. It is useful as a molding or casting resin and forms a clear, colorless formed mass.

EXAMPLE 14

(a) The product of Example 7(b), namely 1-($\beta$-aminoethyl) - 3 - vinyl - tetrahydro - pyrimidone - 2, is polymerized by the procedure of Example 12 to produce a homopolymer solution useful as a wet strength resin in paper at 0.5 to 1.5% on the weight of the dry fiber.

(b) A homopolymer of 1-(β-octadecylaminoethyl)-3-vinyl-imidazolidinone-2 is obtained by polymerizing the product of Example 6(a) by the procedure of Example 12. When this polymer solution is rubbed on leather and dried, softening or flexibilizing effect is obtained. Quaternization of the polymer with benzyl chloride in ethanol at reflux produces a polymer having a strong antistatic effect when applied in solution concentrations of 0.3 to 1.5% to fibrous materials, including fibers, filaments, and yarns of cellulose acetate, copolymers of vinyl chloride with vinyl acetate and polymers of acrylonitrile.

EXAMPLE 15

A homopolymer of 1 - (β - dicyclohexylaminoethyl)-3-vinyl-tetrahydro-pyrimidinone-2 of Example 7(a) is obtained by the procedure of Example 12. When applied to leather goods, a water-repellent coating is obtained.

EXAMPLE 16

By the general procedure of Example 13, copolymers are obtained from mixtures of:

(a) 25 parts of 1 - (β - methylaminoethyl) - 3 - vinyl-imidazolidinone-2 and 75 parts of isobutylene;

(b) 10 parts of 1 - (β - didodecylaminoethyl) - 3-vinyl-tetrahydro-pyrimidinone-2, 67 parts of methyl methacrylate, and 23 parts of butyl acrylate;

(c) 5 parts of 1 - (β - morpholinoethyl) - 3 - vinyl-imidazolidinone-2, 90 parts of acrylonitrile, and 5 parts of vinyl acetate;

(d) 80 parts of 1 - (β - dicyclohexylaminoethyl) - 3-vinyl-tetrahydro-pyrimidinone-2, and 20 parts of styrene;

(e) 50 parts of 1 - (β - dimethylaminoethyl) 3 - vinyl-imidazolidinone-2, and 50 parts of ethyl acrylate.

The copolymers of parts (a) through (e) are useful as coating, casting and molding materials. Quaternary ammonium salts of the polymers obtained by alkylating with methyl chloride and with benzyl chloride have various uses. All are non-phytotoxic fungicides, those of (d) and (c) being the most effective and tenacious.

It is to be understood that changes and variations may be made without departing from the spirit and scope of the invention as defined in the appended claims.

I claim:

1. A compound of the formula $$CH_2=CHN\diagup^A_C\diagdown NZN\diagup^R_{R'}$$
$$\phantom{CH_2=CHN}{\|}$$
$$\phantom{CH_2=CHN}O$$

where A is an alkylene group having 2 to 3 carbon atoms of which at least two extend in a chain between the adjoined N atoms, Z is an alkylene group having 2 to 18 carbon atoms of which at least two extend in a chain between the N atoms, R, when attached to R' only through the adjoining nitrogen atom, is selected from the group consisting of H, phenyl, benzyl, cyclohexyl, and alkyl and alkenyl groups having from 1 to 18 carbon atoms, R', when attached to R only through the adjoining nitrogen atom, is selected from the group consisting of H, phenyl, benzyl, cyclohexyl, and alkyl and alkenyl groups having from 1 to 18 carbon atoms, and R and R', when attached directly together, form a heterocyclic ring with the adjoining N atom of the formula and are selected from the group consisting of the morpholino residue $$=(CH_2CH_2)_2O,$$

the piperidino residue —$(CH_2)_5$— and the pyrrolidino residue —$(CH_2)_4$—.

2. A polymer of a compound of claim 1.

3. A copolymer of a compound of claim 1 with at least one other monoethylenically unsaturated comonomer.

4. A copolymer of a compound of claim 1 with a diethylenically unsaturated compound.

5. 1-(β-aminoethyl)-3-vinyl-imidazolidinone-2.

6. A polymer of 1-(β-aminoethyl)-3-vinyl-imidazolidinone-2.

7. 1-(β-methylaminoethyl)-3-vinyl-imidazolidinone-2.

8. A polymer of 1 - (β - methylaminoethyl) - 3 - vinyl - imidazolidinone-2.

9. 1-(β-dimethylaminoethyl)-3-vinyl-imidazolidinone-2.

10. A polymer of 1-(β-dimethylaminoethyl)-3-vinyl-imidazolidinone-2.

11. A copolymer of 1-(β-dimethylaminoethyl)-3-vinyl-imidazolidinone-2 with an ester of an acid selected from the group consisting of acrylic, methacrylic, and itaconic acids.

12. A copolymer of 1-(β-dimethylaminoethyl)-3-vinyl- 13. 1 - (β - octadecylaminoethyl) - 3 - vinyl - imidazol - idinone-2.

14. 1 - (β - aminoethyl) - 3 - vinyl - tetrahydropyrimidinone-2.

References Cited in the file of this patent

UNITED STATES PATENTS 2,727,016   Hankins et al. _____ Dec. 13, 1955

OTHER REFERENCES

Reppe: "Acetylene Chemistry," P. B. Report 18852–S, translated from the German), pages 62–63 (1949). Bibliography of Technical Reports (OTS), November 1948.

UNITED STATES PATENT OFFICE
CERTIFICATE OF CORRECTION

Patent No. 2,840,545                                                      June 24, 1958

Robert S. Yost

It is hereby certified that error appears in the printed specification of the above numbered patent requiring correction and that the said Letters Patent should read as corrected below.

Column 12, line 38, for "-3-vinyl-" read -- -3-vinyl-imidazolidinone-2 with methyl methacrylate. --.

Signed and sealed this 26th day of August 1958.

(SEAL)
Attest:

KARL H. AXLINE
Attesting Officer

ROBERT C. WATSON
Commissioner of Patents